Patented July 28, 1942

2,291,211

UNITED STATES PATENT OFFICE 2,291,211

OXIDATION OF KETONES

Robert M. Cavanaugh, Woodbury, N. J., assignor to E. I. du Pont de Nemours & Company, Wilmington, Del., a corporation of Delaware No Drawing. Application July 9, 1940,
Serial No. 344,497

2 Claims. (Cl. 260—537)

This invention relates to a method for the preparation of dicarboxylic acids, and more particularly to their preparation from alicyclic ketones.

Adipic acid has assumed recently a position of considerable importance as an organic intermediate product. Various methods have been proposed for its preparation by oxidation procedures, using, for example, air or nitric acid as oxidizing agent and starting with such materials as cyclohexane, cyclohexanol, and cyclohexylamine. Under certain conditions it is desirable to employ cyclohexanone as the starting material. When this latter is oxidized with nitric acid in conventional fashion, however, the reaction tends to assume violent proportions. The same difficulty is met in the oxidation to dicarboxylic acids of other ketones of the cycloparaffin series and their alkyl derivatives.

An object of the present invention is an improved method for the oxidation of a material taken from the group consisting of the saturated alicyclic ketones. A further object is a method for the production of adipic acid by such a procedure. Additional objects will be disclosed as the invention is described more at length in the following.

I have found that the foregoing objects are accomplished when cyclohexanone, or other ketone of the cyclo-paraffin series, is reacted with nitric acid after preliminary dilution with a solvent which is substantially inert chemically to nitric acid under the conditions of treatment. Cyclohexanone is very readily oxidized and a wide range of concentrations of nitric acid is available. I find it desirable to use acid of an initial strength between 5 and 95% $HNO_3$. Nitric acid of 60% concentration is very suitable for use and is readily available commercially. While the conditions of operation may be widely varied, I find it desirable to maintain the reaction temperature between 40° and 120° C. and to operate at a pressure between 0.5 and 5.0 atmospheres. Operation at atmospheric pressure gives very favorable results. It is desirable, furthermore, that a small amount of $NO_2$ be present in the initial nitric acid in order to bring about an immediate initiation of the oxidation reaction.

A number of different solvents for cyclohexanone, or other ketone of the cyclo-paraffin series, can be utilized satisfactorily. I may employ, for example, various hydrocarbons such as cyclohexane; such mixtures of hydrocarbons as are found in gasoline; pure hydrocarbons of the methane series having boiling points between 40° and 120° C. under the conditions of pressure prevailing; nitrohydrocarbons such as nitromethane, nitroethane, and nitrated products of propane; halogenated derivatives of hydrocarbons such as chlorinated ethane, chloroform, carbon tetrachloride, and many others. The main essential is that the solvent be one that is itself not attacked strongly by the nitric acid under the conditions of operation.

As specific embodiments of my invention, the following examples will serve:

Example 1

Twelve grams of cyclohexanone was dissolved in 32 grams cyclohexane and the solution was added during the course of an hour to a vessel containing 33 grams of cyclohexane and 50 grams of 60% nitric acid. The vessel containing the cyclohexane and the nitric acid was connected to a reflux condenser and was at a temperature of around 82° C., so that the cyclohexane was at its boiling point. The nitric acid in the reaction vessel contained a small amount of $NO_2$ at the start of the reaction to assure immediate oxidation of the ketone. Atmospheric pressure prevailed during the reaction, which was substantially complete after 1 hour. The products comprised 13 grams adipic acid and 4 grams of lower dicarboxylic acids. The reaction ran smoothly throughout.

Example 2

Adipic acid is produced also by the reaction of cyclohexane with nitric acid, and one of the reaction products in addition to adipic acid is nitrocyclohexane. The sodium salt of this latter compound may be converted to cyclohexanone by the action of a dilute sulfuric acid solution, and this cyclohexanone may then be oxidized by nitric acid to form additional adipic acid. The present invention is applicable to this step of the process of obtaining the maximum yield possible of adipic acid from cyclohexane, for example, in accordance with the following procedure.

Starting with 65 grams of cyclohexane, 214 grams of 58% $HNO_3$ and 5 grams of $NO_2$, conversion from nitrocyclohexane yielded 11 grams of cyclohexanone. This latter was diluted with 25 grams of cyclohexane and the solution was added to the oxidizing vessel containing 50 grams of 60% $HNO_3$ and 40 grams of cyclohexane maintained at a temperature of 75°–85° C. The reaction was carried out at atmospheric pressure, and the oxidizer was fitted with a reflux condenser. An initial concentration of $NO_2$ was maintained in the reaction mixture. The reaction proceeded smoothly and was substantially complete in 1 hour. The products of the reaction separated into an aqueous and a non-aqueous layer. Adipic acid was present in the aqueous layer and was obtained therefrom by crystallization. Thirteen grams of adipic acid was obtained from this cyclohexanone oxidation, and the cyclohexane was recovered almost quantitatively for use subsequently.

The procedure according to the present invention is adapted for application in the oxidation of cyclohexanone, or other ketone of the cyclo-paraffin series, and is applicable also, as illustrated in Example 2, as one step in the process described in the co-pending application Serial No. 348,368, dated July 30, 1940. As has been stated, the advantage of carrying out my process in the presence of a diluent comes in the much smoother course of the oxidation reaction resulting when such diluent is used, whereas, without its use, the reaction tends to become too violent for safety in large scale operations. The presence of the diluent causes the reaction to proceed smoothly and quietly. Preferably, a weight of cyclohexane or other soluble diluent will be used at least equal in amount to the weight of the cyclohexanone. However, various proportions of diluent and reactant may be used, for example, from 1 to 10 parts of diluent by weight to 1 part of cyclohexanone, though even smaller amounts may be used. The acid ratio may likewise vary considerably, and I may employ between 0.6 and 6.0 parts 100% $HNO_3$ to 1 part of cyclohexanone. A favorable nitric acid ratio is 3 to 1.

My invention has been described mainly with reference to cyclohexanone in the foregoing. It is applicable also to various other ketones of the saturated alicyclic class, as well as to their alkyl derivatives. I may bring about the oxidation according to this process, therefore, of cyclopentanone, cyclohexanone, cycloheptanone, cyclooctanone, methylcyclohexanone, dimethylcyclohexanone, and other ketones of this type and their derivatives.

I have described my invention at length in the foregoing. It will be understood, however, that many variations in details of procedure and compositions may be introduced without departure from the spirit of the invention. I wish to be limited only by the following patent claims.

I claim:

1. The method for the oxidation of cyclohexanone to adipic acid by means of nitric acid, which comprises diluting the cyclohexanone with a solvent selected from the group consisting of the hydrocarbons, the nitrohydrocarbons, and the halogenated hydrocarbons, and treating with nitric acid of approximately 60% concentration at a temperature between 40° C. and 120° C. while maintaining the pressure between 0.5 and 5.0 atmospheres.

2. A method for the oxidation of compounds taken from the group consisting of the saturated alicyclic ketones and their alkyl derivatives, which comprises diluting the ketone with a solvent selected from the group consisting of the hydrocarbons, the nitrohydrocarbons, and the halogenated hydrocarbons, and treating with nitric acid of 5% to 95% concentration at an acid ratio of 0.6 to 6.0 parts 100% nitric acid to one part of ketone, at a temperature between 40° C. and 120° C. while maintaining the pressure between 0.5 and 5.0 atmospheres.

ROBERT M. CAVANAUGH.